US012630220B2

(12) United States Patent
Gecchelin

(10) Patent No.: US 12,630,220 B2
(45) Date of Patent: May 19, 2026

(54) MODULAR KINEMATIC STEERING DEVICE

(71) Applicant: GETPLUS S.R.L., Padua (IT)

(72) Inventor: Tommaso Gecchelin, Padua (IT)

(73) Assignee: GETPLUS S.R.L., Padua (IT)

( * ) Notice: Subject to any disclaimer, the term of this patent is extended or adjusted under 35 U.S.C. 154(b) by 391 days.

(21) Appl. No.: 18/252,743

(22) PCT Filed: Aug. 24, 2021

(86) PCT No.: PCT/IB2021/057739
§ 371 (c)(1),
(2) Date: May 12, 2023

(87) PCT Pub. No.: WO2022/101698
PCT Pub. Date: May 19, 2022

(65) Prior Publication Data
US 2024/0001990 A1    Jan. 4, 2024

(30) Foreign Application Priority Data

Nov. 16, 2020    (IT) ........................ 102020000027345

(51) Int. Cl.
B62D 13/00        (2006.01)
B62D 7/14        (2006.01)
        (Continued)

(52) U.S. Cl.
CPC ............. B62D 12/02 (2013.01); B62D 7/144 (2013.01); B62D 53/005 (2013.01);
        (Continued)

(58) Field of Classification Search
CPC ............ B60G 2300/36; B60G 2300/37; B62D 13/00; B62D 53/00; B62D 53/005; B62D 12/02; B62D 7/144
See application file for complete search history.

(56) References Cited

U.S. PATENT DOCUMENTS 3,734,538 A * 5/1973 Humes ................... B62D 13/00
                                        280/426
4,943,078 A * 7/1990 McGhie ................. B62D 53/08
                                        280/425.2

(Continued)

FOREIGN PATENT DOCUMENTS

GB        2341157 A    3/2000

OTHER PUBLICATIONS

International Search Report and Written Opinion, mailed Dec. 2, 2021 to Getplus S.R.L. for International Application No. PCT/IB2021/057739.

(Continued)

*Primary Examiner* — Gonzalo Laguarda
(74) *Attorney, Agent, or Firm* — Vorys, Sater, Seymour and Pease LLP; Maryellen Feehery Hank; Anthony P. Venturino

(57)        ABSTRACT

Modular kinematic steering device, for installation on at least a first module and module of a system of modular vehicles, each module including at least two axes, for each axis, a kinematic steering mechanism adapted to move wheels connected to the axis, a rudder for controlling the kinematic steering mechanism, arranged transversely relative to the axes, the rudder constrainable to the mechanism to transmit rudder motion to the wheels by the mechanism, the rudder defining a variable steering ratio relative to each axis, a mechanism locking device, to make one of the axes a fulcrum rotation of the rudder rigidly connecting the mechanism with the rudder, wherein the first module includes a first rudder having first and second distal ends and the second module includes a second rudder having first and second distal ends, and the distal ends countered and/or counter-shaped to be rigidly connected to each other.

12 Claims, 3 Drawing Sheets

Figure 1:
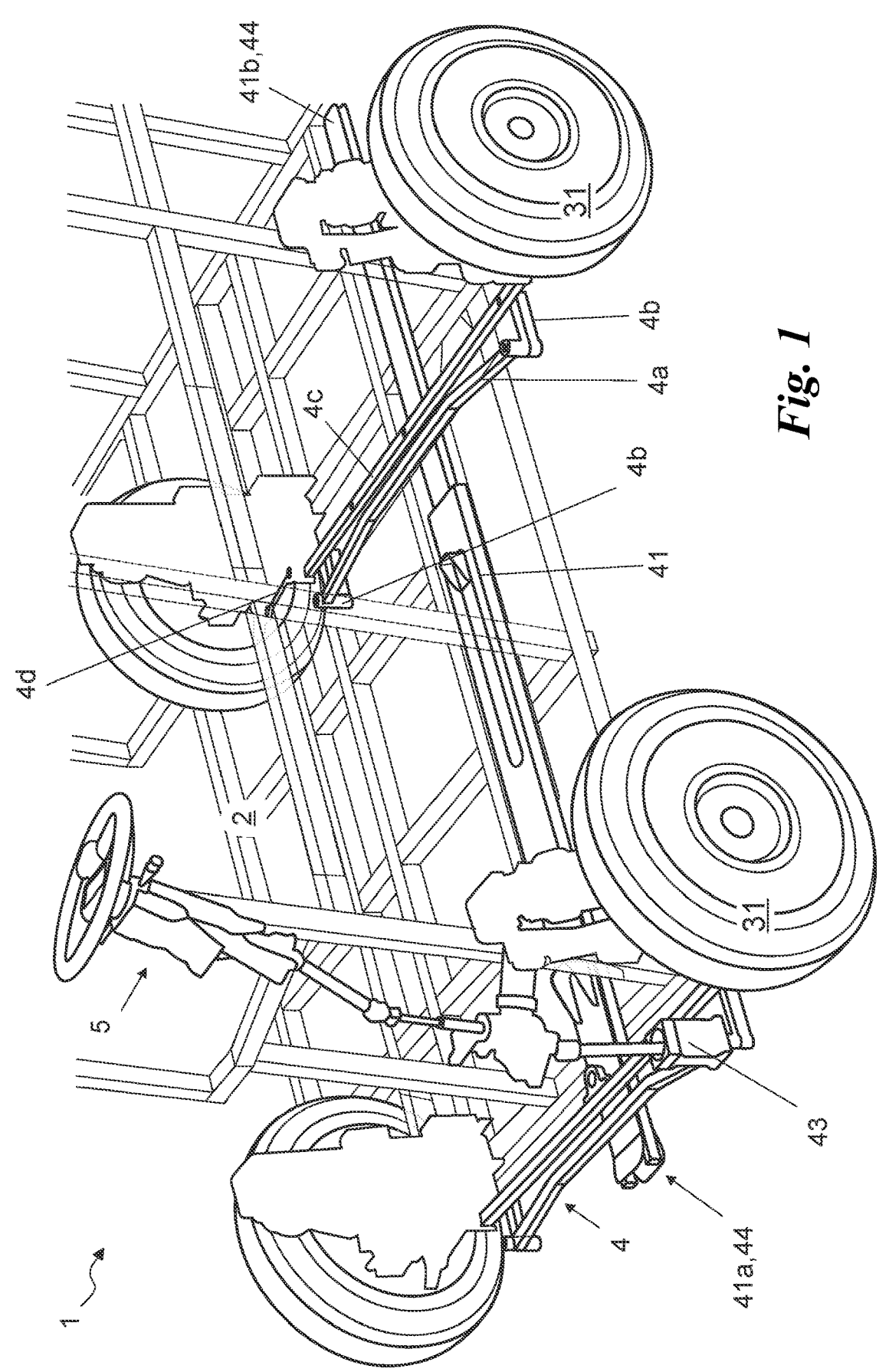

(51) Int. Cl.
    *B62D 12/02*           (2006.01)
    *B62D 53/00*           (2006.01)

(52) U.S. Cl.
    CPC .......... *B60G 2300/37* (2013.01); *B62D 13/00*
               (2013.01); *B62D 53/00* (2013.01)

(56)              References Cited

U.S. PATENT DOCUMENTS

| | | | |
|---|---|---|---|
| 6,059,056 A * | 5/2000 | Becker ................. | B62D 7/1536 |
| | | | 180/410 |
| 8,424,897 B1 * | 4/2013 | Sutton .................... | B62D 53/00 |
| | | | 180/22 |
| 10,220,664 B1 | 3/2019 | Brey | |
| 2009/0236823 A1 * | 9/2009 | Prem ...................... | B62D 13/04 |
| | | | 280/426 |
| 2015/0076783 A1 * | 3/2015 | Swoboda ................. | B60G 3/04 |
| | | | 280/124.134 |
| 2015/0266505 A1 * | 9/2015 | Merkel ................. | B62D 7/144 |
| | | | 180/411 |

OTHER PUBLICATIONS

Search Report, completed Jul. 6, 2021 to Getplus S.R.L. for Italian Application No. 102020000027345.

* cited by examiner

MODULAR KINEMATIC STEERING DEVICE

The present invention relates to a modular kinematic steering device of the type specified in the preamble of the first claim.

The types of steering present on vehicles are currently known.

Specifically, vehicles having a trailer, towing or similar have the need to transmit a steering command to all the steering wheels of the vehicle. If the vehicle is not of considerable size, for example a vehicle having only two axles, steering systems of the wheels of the front axis and/or of the rear axis are known.

For example, consider a mechanical rudder steering between articulated vehicles similar to that of airport trolleys, where in the case of articulated vehicles the steering system moves the entire steering axis and the vehicle has an articulated connection between the components of the vehicle train.

Furthermore, as an example of the known art, the hydraulic or hydro-mechanical steering systems with tie rods between the axles, wherein there is no mechanical connection between the axles of the joined vehicles, which instead are electronically and hydraulically piloted, are considered as an example of the known art.

The known art described includes some important drawbacks.

In particular, in the case of vehicles with multiple axles and complex steering systems, in the event of a hydraulic system failure there is no mechanical safety backup that complies with the ECE79 regulations on steering systems for road vehicles.

Furthermore, usually in large vehicles, for example with a large number of axles, the steering system is very expensive both in economic terms and in terms of energy consumption, being completely hydraulic and driven by a combustion engine.

In addition, usually in large vehicles, for example with a large number of axles, the steering system does not have a geometry that can be adapted to road vehicles with traditional suspension and steering geometries such as double wishbone and McPherson.

Finally, in the steering systems of the prior art, in vehicles composed of several modules or in general by the connection of several elements, when two modules are joined together there is no mechanical connection between the axles of the steering systems of the joined vehicles, which instead they are driven only electronically and hydraulically, affecting the functional safety of the system and increasing production and maintenance costs.

In this situation, the technical task underlying the present invention is to devise a modular kinematic steering device capable of substantially obviating at least part of the aforementioned drawbacks.

Within the scope of said technical task, it is an important object of the invention to obtain a device which transmits a steering command to all axes of a vehicle in a completely mechanical way.

Another important object of the invention is to provide a steering device adaptable to common suspension and steering systems such as double wishbone and McPherson.

Still, an object of the invention is to provide a steering device capable of controlling kinematic steering of the wheels of different axles according to its geometry, without electronic corrections.

The technical task and the specified aims are achieved by a modular kinematic steering device as claimed in the annexed claim 1.

Preferred technical solutions are highlighted in the dependent claims.

Figure 2:
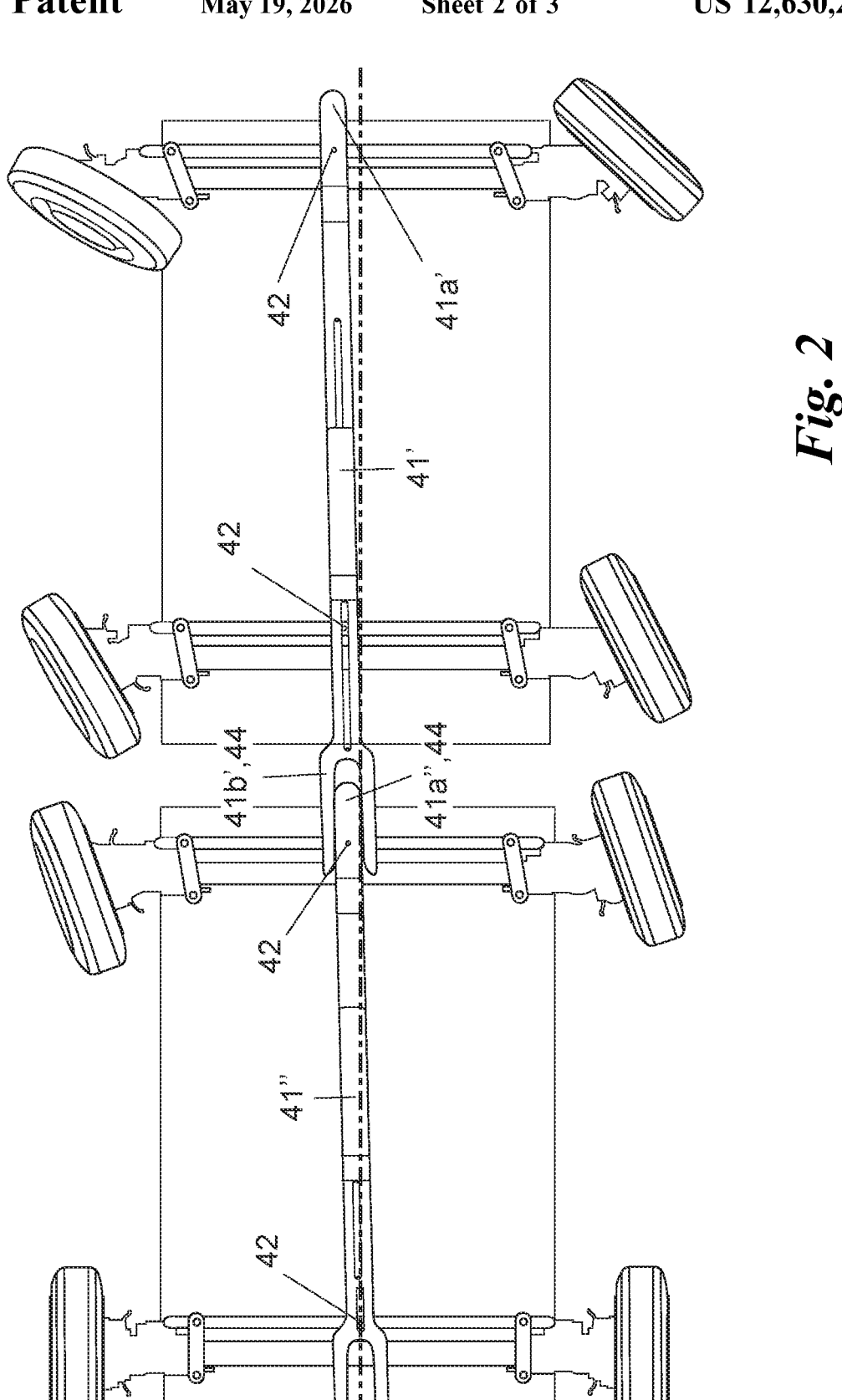
Figure 4:
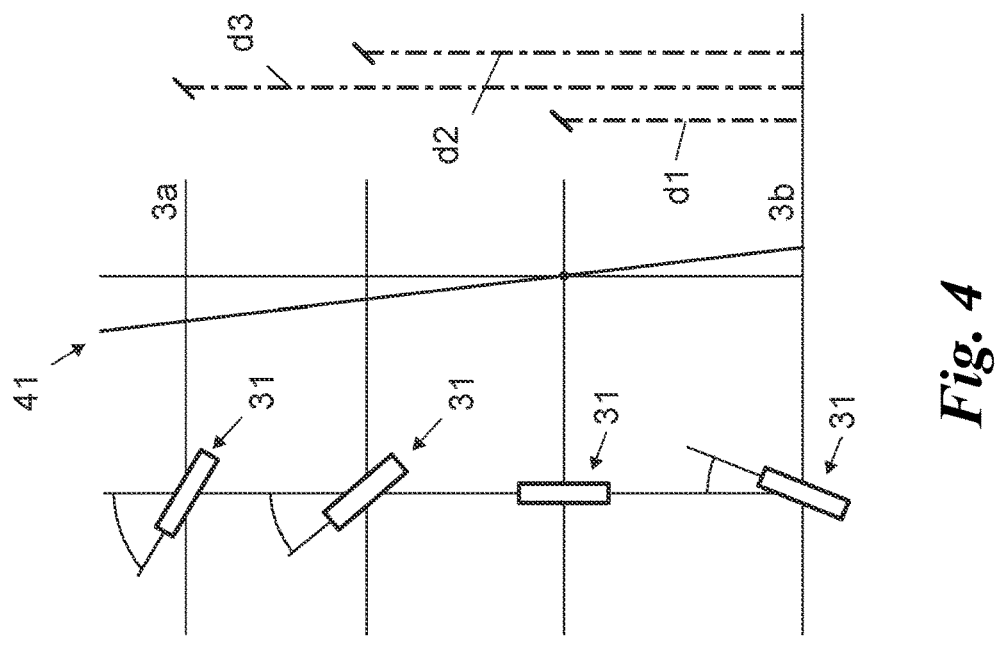
Figure 3:
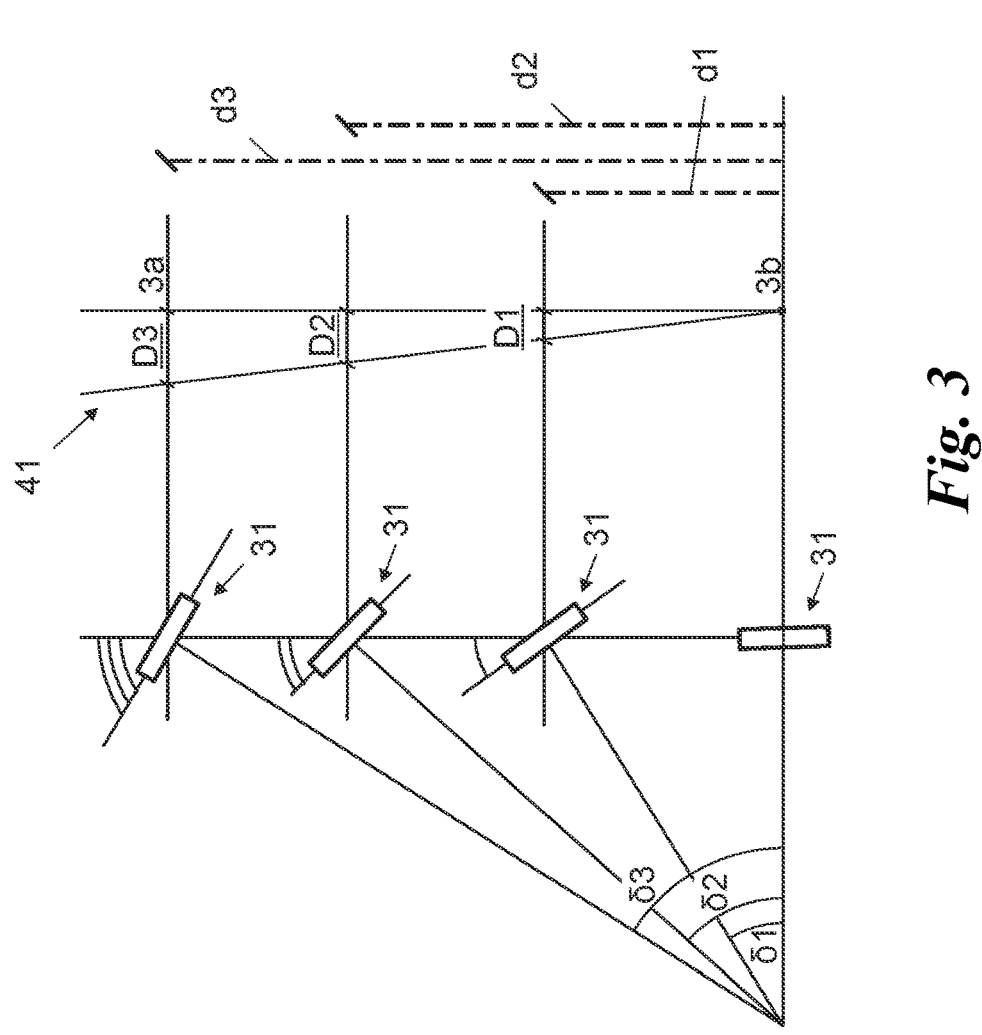

The characteristics and advantages of the invention are clarified below by the detailed description of preferred embodiments of the invention, with reference to the accompanying figures, in which:

the FIG. 1 shows the kinematic steering device applied to a vehicle with two axes;

the FIG. 2 illustrates an embodiment of the device applied to a system of modular vehicles;

the FIG. 3 is a kinematic diagram of the operation of the device when applied to a vehicle equipped with a plurality of axes and with the rudder arm lock device provided on the rearmost axle; and the FIG. 4 shows a kinematic diagram of the operation of the device when applied to a vehicle equipped with a plurality of axes and with the rudder arm lock device provided on an intermediate axis.

In the present document, the measurements, values, shapes and geometric references (such as perpendicularity and parallelism), when associated with words like "about" or other similar terms such as "approximately" or "substantially", are to be considered as except for measurement errors or inaccuracies due to production and/or manufacturing errors, and, above all, except for a slight divergence from the value, measurements, shape, or geometric reference with which it is associated. For instance, these terms, if associated with a value, preferably indicate a divergence of not more than 10% of the value.

Moreover, when used, terms such as "first", "second", "higher", "lower", "main" and "secondary" do not necessarily identify an order, a priority of relationship or a relative position, but can simply be used to clearly distinguish between their different components.

Unless otherwise specified, as results in the following discussions, terms such as "treatment", "computing", "determination", "calculation", or similar, refer to the action and/or processes of a computer or similar electronic calculation device that manipulates and/or transforms data represented as physical, such as electronic quantities of registers of a computer system and/or memories in, other data similarly represented as physical quantities within computer systems, registers or other storage, transmission or information displaying devices.

The measurements and data reported in this text are to be considered, unless otherwise indicated, as performed in the International Standard Atmosphere ICAO (ISO 2533:1975).

With reference to the Figures, the device according to the invention is globally indicated with the number 1.

The device 1 described here is a kinematic steering device adapted to be installed on a vehicle 2. Kinematic steering in this document means a steering that provides that the wheels connected to at least one axis of a vehicle perform the steering with a steering ratio and/or steering angle different from each other, for example a steering capable of differentiating the angles of the two wheels on a single steering axis.

The vehicle 2 is a vehicle comprising at least two axes 3. Preferably, said vehicle 2 is a non-articulated vehicle.

Said axes 3 of the vehicle 2 according to the invention are equipped with a kinematic steering mechanism 4 adapted to move wheels 31 connected to said axes 3. According to the present invention, said mechanism 4 and said axes 3 are both connected to the wheels 31, as shown in FIG. 1, and are arranged substantially parallel to each other. The axes 3 is provided with a hub and with every means of the known art able to allow the rotation in more than one plane of said wheel 31, for example a rotation in a vertical plane for the motion and in a horizontal plane for the steering.

The mechanism 4 can for example be composed of a kinematic mechanism connected to said wheels 31. An example of a preferred kinematic mechanism is shown in FIG. 1, where said mechanism 4 comprises a plurality of components suitable for realizing an articulated parallelogram suitable for guaranteeing kinematic steering on said wheels 31. Again, preferably said mechanism 4 comprises a fixed rod 4a, two cranks and/or rocker arms 4b and a connecting rod 4c, said connecting rod connected at both ends to steering tie-rods 4d connected to the wheels.

Preferably, said steering mechanism 4 is placed in correspondence with each of said axes 3.

Preferably, the device 1 comprises a rudder 41 for controlling said kinematic steering mechanism 4. The rudder 41 is arranged transversely with respect to the axes 3, thus surmounting each of said axes as shown in FIG. 1 and can be connected to said mechanism 4.

By rudder 41 it is meant a rigid mechanical element, capable of transmitting a movement, that is, said command for example induced at one end of the same rudder 41.

The shapes and materials of said rudder 41 can for example be further adapted to provide structural rigidity as will be clarified hereinafter in a preferred embodiment of the invention.

Again, preferably, the connection between the rudder 41 and said mechanism 4 is such as to allow the transmission of motion from said rudder 41 to said wheels 31 by means of said mechanism 4. The transmission of motion can also take place in the opposite direction, from mechanism 4 to rudder 41, as will become clear in the following document.

Preferably, the rudder 41 is constrainable to said mechanism 4 in correspondence of each of said axes 3.

Preferably, the device 1 comprises a locking device 42 of said mechanism 4 which can be activated on each axis 3. The locking device 42 is able to make integral said rudder 41 by blocking the movement thereof, said mechanism 4 and said wheels 31, thus not allowing the lateral movement of the rudder 41 with respect to said axis 3 and therefore preventing the transmission of a steering command to the wheels 31 at said axis 3. Therefore, said locking device 42 is adapted to make the axis 3 on which the locking device 42 is active the fulcrum of rotation of said rudder 41 by rigidly connecting said mechanism 4 with said rudder 41. When the locking mechanism 42 is active, the lateral movement of the rudder 41 is therefore blocked by means of said steering mechanism 4, for example by directly or indirectly blocking the movement of the connecting rod 4c, preventing by transmitting the steering control from the rudder 41 to the wheels 31. Preferably, the locking device 42 stops the rudder 41 in a substantially central position with respect to the two wheels 31 connected to the axis 3 on which said locking device 42 is activated. Therefore, the device 1 according to the present invention realizes through said drawbar 41 a variable steering ratio on each of said wheels 31 of said axes 3 of said vehicle 2.

Furthermore, preferably said vehicle comprises a front axis 3a and a rear axis 3b. The vehicle can generally comprise a plurality of axes defining in the same way a front axis 3a and a rear axis 3b.

In the embodiment shown in FIG. 1 said front axis 3a of said vehicle 2 comprises connection means 43 to control means 5 present on said vehicle 2 and accessible to a user.

The connection means 43 can consist of purely mechanical, pneumo and/or electro-assisted connection means 43. In the preferred embodiment, said connection means 43 are purely mechanical suitable for imparting commands to said rudder 41. Said connection means 43 can connect said kinematic steering mechanism 4, which when rigidly connected to said rudder 41 allows its movement. The rudder 41 is therefore adapted to issue a different kinematic steering command for each axes 3, where said command is achieved through the geometric characteristics of the rudder 41 and/or as a function of the position of the locking device 42 with respect to the axes 3. The steering different kinematics between different axes is therefore implemented as a function of a quantity proportional to the steering, or to the angle and/or distance from a vertical, of said rudder 41 with respect to said axis 3. The kinematic steering of the wheels 31 of the same axis 3, which provides that two wheels 31 of the same axis 3 have different steering angles, said wheels 31 therefore receiving a single command from said rudder 41, is achieved by means of the steering mechanism 4, and therefore as a function of the kinematic mechanism used to transmit the command from the rudder 41 to the wheels 31.

An example of what is described is shown in FIG. 3 through a kinematic diagram in which the device 1, by means of the rudder 41 locked by means of the device 42 on a rear axle 3b. The rudder 41 therefore, as a function of the distance from a vertical, imposes a substantially increasing steering angle as the distance of said axis 3 increases from the rear axis 3b on which the locking device 42 is present.

Again, for example, when the locking 42 is active on an axle 3 which is not the rear axis 3b of a vehicle 2, said rudder 41 transmits a counter-steering command to the wheels 31 located on the axes 3 downstream of said locking 42. An example of this configuration is shown schematically in FIG. 4.

The present invention also relates to a modular kinematic steering device 1 adapted to be installed on a system 10 of modular vehicles.

By modular vehicles, or rather by modules of said system, it is meant said vehicles 2 which are just described.

Said modular vehicle system 10 comprising at least a first module 2' and a second module 2". Preferably, when said modules are connected to form said system 10, they form a system 10 which is similar to a non-articulated vehicle, as will be clear from the explanation of the connection between said modules.

Each module 2', 2" comprises a modular kinematic steering device 1.

Said modular kinematic steering device 1 is a kinematic steering device 1 as just described in the present document, more preferably comprising a rudder 41 having a first distal end 41a and a second distal end 41b countered and/or counter-shaped in order to be rigidly connectable to each other. By rigid connection in this document it is meant a connection that allows at least the transmission of a steering command through the combination of two or more rudders 41 of two or more modular vehicles 2', 2".

Preferably, said modular vehicle system 10 comprises at least a first module 2' and a second module 2", said first module 2' comprising at least a first rudder 41' having a first and a second distal ends 41a', 41b', said second module 2" comprising at least a second rudder 41" having a first and a second distal ends 41a", 41b", in which said distal ends 41a', 41b" and/or 41b' and 41a" are countered and/or counter-shaped in order to be rigidly connectable to each other.

For example, as shown in FIG. 2, said first module 2' comprises, in correspondence with the rear axis 3b, a distal end 41b' adapted to rigidly connect a distal end 41a" of said second module 2". Said ends 41a, 41b can be oriented in any way with respect to the axes 3 of the modular vehicle 2', 2".

Therefore, the junction of several modular vehicles 2', 2" takes place through the realization of an inter-vehicular rudder 41 which possesses the same properties already discussed with regard to the rudder 41 already described.

Again, preferably, said rudders 41' and 41" each comprise a first distal end 41a and a second distal end 41b adapted to be connected by means of a coupling system 44.

More preferably, said coupling system 44 is present on each distal end 41a, 41b. Furthermore, components which concur to form the coupling system 44 may be present partly on one end and partly on the end that the latter connects.

Again, preferably, said coupling system 44 is a non-articulated coupling system. In fact, as clear from the description, the coupling system 44 connects a plurality of rudders 41 in order to transmit a steering command in a non-articulated manner, for example without creating relative rotation angles between the two rudders 41', 41" of two vehicles 2', 2" coupled in order to obtain an inter-vehicular rudder and again without creating angles of relative rotation between the same vehicles 2', 2" connected to form said system 10.

Preferably again, said coupling system 44 is adapted to activate and/or deactivate said locking device 42 of said kinematic steering mechanism 4 of an axis 3 by mechanical interference.

Alternatively, or in combination with what has been described, said locking device 42 is electro-actuated.

The operation of the device 1 previously described in structural terms is as follows. In the embodiment shown in FIG. 1 there is therefore the device 1 applied to a 2-axle vehicle; in this case the selection of the axis on which locking device 42 of the rudder is active, it is limited since the rear axle 3b necessarily becomes the fulcrum of the rudder 41. Once the rudder 41 is pivoted on the axis 3b, said rudder 41 receives a steering control by means of control means 5 connected to the kinematic steering mechanism 4 housed near the front axis 3a. The control then rotates and/or integrally moves the mechanism 4, the wheels 31 and the rudder 41, the latter rotating around the fulcrum positioned by means of the device 42 on the rear axis 3b. Single vehicle geometry results in standard front axis steering, in the preferred embodiment kinematic type steering, while the rear axis remains non-steered as the rudder pivots on the rear axis. The result is a drivability typical of short wheelbase road vehicles such as a small car.

In general, the steering angle on the various vehicle axes is determined completely mechanically based on the amount of steering applied to the most advanced axle; the steering command is transmitted via an inter-vehicular rudder connected between the steering axes. When two or more vehicles are coupled to each other, the respective rudders are coupled rigidly and integrally, effectively creating a long inter-vehicular rudder whose operation is similar to that described in the system with only two axes.

The system, when equipped with more than two axles, can be made even more performing by ensuring a lower steering radius, by means of the locking device 42 which prevents an axis other than the first and the last from steering. In this way the fixed axis through the locking system acts as the rotation fulcrum of the rudder-inter-vehicular so that the axes behind the fulcrum will counter-steer.

The device 1 according to the invention achieves important advantages.

In fact, with respect to the steering systems of the known art applied to vehicles with several axles and of large dimensions, the device 1 described here represents a very economical alternative to implement.

The device 1 shown can be further hydraulically and electronically servo-assisted, but advantageously compared to prior art systems, in the event of a failure of the steering servo-assistance systems, the mechanical connection makes the system compliant with the ECE79 directives and guarantees the highest level of functional safety. The device 1 according to the present invention represents an alternative with a high degree of safety in case of failures.

Furthermore, thanks to the device 1 according to the present invention, the steering ratio between the various axes is automatically coordinated by the geometry of the system without the need for electronic corrections.

The invention is susceptible of variants falling within the scope of the inventive concept defined by the claims. In this context, all the details can be replaced by equivalent elements and the materials, shapes and dimensions can be any.

The invention claimed is:

1. A modular kinematic steering device adapted and configured to be installed on at least a first module and a second module of a system of modular vehicles, each of said modules comprising at least two axis, for each axis, a kinematic steering mechanism adapted and configured to move wheels connected to said axis, a rudder for controlling said kinematic steering mechanism, arranged transversely with respect to the axis, said rudder adapted and configured to be constraint to said kinematic steering mechanism to allow the transmission of motion from said rudder to said wheels by means of said kinematic steering mechanism, said rudder defining a variable steering ratio with respect to each of said axis, a locking device of said kinematic steering mechanism, adapted and configured to make one of said axis the fulcrum of rotation of said rudder by rigidly connecting said kinematic steering mechanism with said rudder, and wherein said first module comprises at least a first said rudder having first and second distal ends and wherein said second module comprises at least a second said rudder having a first and a second distal ends, and wherein said distal ends are contoured and/or counter-shaped in order to be rigidly connected to each other to at least connect the first rudder and the second rudder.

2. The device according to claim 1, wherein each said rudder comprises said first distal end and said second distal end, adapted and configured to be rigidly connected to each other to transmit a steering command between the first and second rudders through a hooking system to allow at least the transmission of the steering command through the combination of the first and second rudders of the first and second modular vehicles.

3. The device according to claim 1, wherein said hooking system present on each distal end is adapted and configured to activate and/or deactivate by mechanical interference a device for locking said kinematic steering mechanism of an axis.

4. The device according to claim 1, wherein said locking device is electro-actuated.

5. The device according to claim 1, in which said hooking system is a non-articulated hooking system.

6. The device according to claim 1, wherein each of said modules comprises at least one front axis and a rear axis and wherein said front axis of said module comprises connection means to control means present on said vehicle and accessible to a user.

7. The device according to claim 1, wherein said kinematic steering mechanism comprises a fixed rod, two cranks and/or rocker arms and a connecting rod, said connecting rod connected at both ends to steering tie-rods connected to the wheels.

8. The device according to claim 1, wherein said locking device of said mechanism, can be activated on each axis and capable of making said axis on which said locking device the rotation fulcrum of said rudder is active.

9. The device according to claim 2, wherein said hooking system present on each distal end is capable of activating and/or deactivating by mechanical interference a device for locking said kinematic steering mechanism of an axis.

10. The device according to claim 9, wherein said locking device is electro-actuated.

11. The device according to claim 10, in which said hooking system is a non-articulated hooking system.

12. The device according to claim 11, wherein each of said modules comprises at least one front axis and a rear axis and wherein said front axis of said module comprises connection means to control means present on said vehicle and accessible to a user.

* * * * *